July 3, 1923.
L. LISSON
FILM SPOOL SUPPORT
Filed Sept. 13, 1922
1,460,971
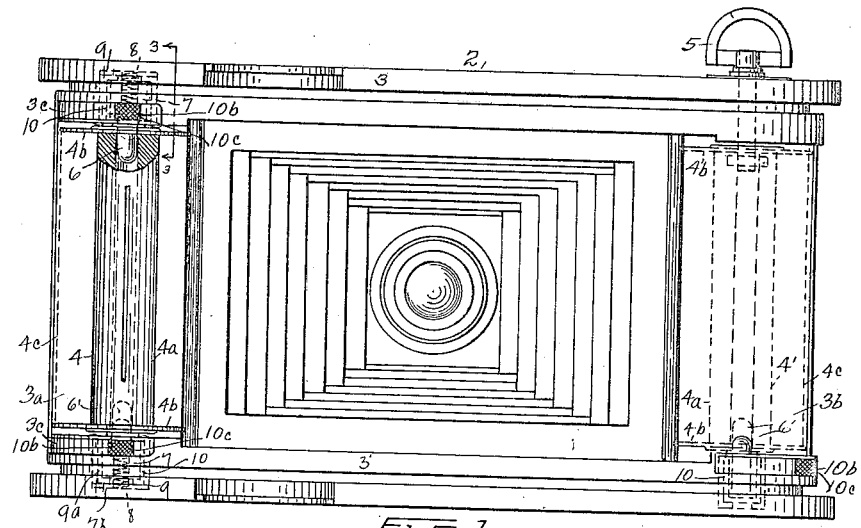
Fig. 1.
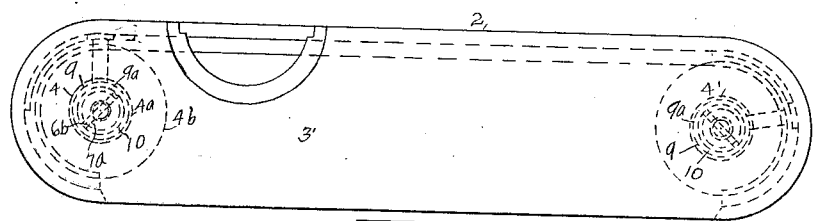
Fig. 2.
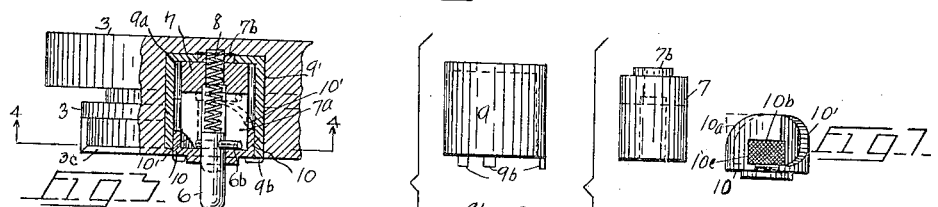
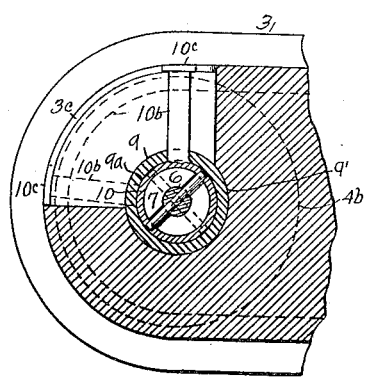
Fig. 4.
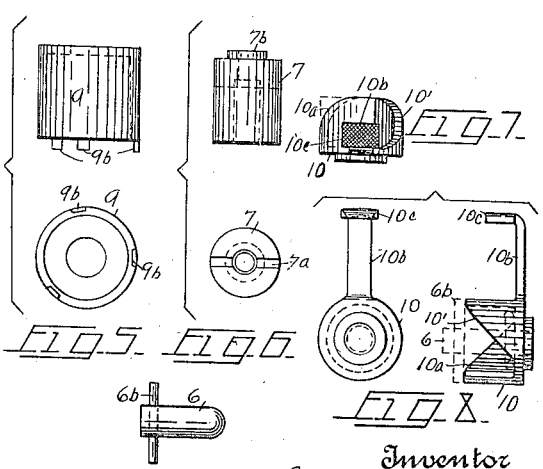
Inventor
Louis Lisson
By Harry D. Wallace
Attorney Patented July 3, 1923.

1,460,971

UNITED STATES PATENT OFFICE.

LOUIS LISSON, OF SYRACUSE, NEW YORK.

FILM-SPOOL SUPPORT.

Application filed September 13, 1922. Serial No. 587,996.

*To all whom it may concern:*

Be it known that I, LOUIS LISSON, a citizen of the United States, residing at Syracuse, in the county of Onondaga and State of New York, have invented certain new and useful Improvements in Film-Spool Supports, of which the following is a specification.

This invention relates to an attachment for photographic cameras, designed particularly for use in connection with the common folding or pocket cameras.

The object of the invention is to provide film-spool supporting means which is novel, simple and compact, and which is arranged to be concealed in sockets formed in the inner faces of the side rails of the camera frame. A further object is to provide yieldable reciprocatable spindles upon which the film reels are rotatable. A further object is to provide novel means for reciprocating the spindles. And a further object is to generally improve and simplify the construction, arrangement and operation of film spool supports of the class.

I attain these objects by the means set forth in the detailed description which follows, and as illustrated by the accompanying drawing, in which—

Figure 1 is a front face view of a well-known folding pocket camera, to which my improvement is applied. Fig. 2 is an edge view of the same. Fig. 3 is an enlarged fragmentary view, partially in elevation and partially in section taken on line 3—3 of Fig. 1. Fig. 4 is a broken vertical longitudinal section, taken on line 4—4 of Fig. 3. Fig. 5 is respectively a side and an end view of the bushing which supports all of the working parts. Fig. 6 is a similar view of the slotted core which supports and guides the spindles. Fig. 7 is a top plan view of the cylindrical cam. Fig. 8 is respectively a front and a side view of the cam. And Fig. 9 is a detached view of one of the spindles.

In the drawing, 2 represents generally the complete camera, which is shown folded ready either for packing or use. The frame of this particular style of camera consists chiefly of similar parallel relatively heavy side rails, as 3 and 3', between which the operating parts and their supports are disposed. The ends of the side rails are usually round, as shown in Figs. 1 and 2, and the said ends usually project a considerable distance beyond the opposite ends of the main body, for providing similar transverse pockets $3^a$—$3^b$, for housing the detachable film spools or reels, as 4—4'. These spools usually comprise hollow cylindrical bodies $4^a$, to the ends of which relatively broad circular heads are attached, and between which the ribbon-like films $4^c$ are wound. As a rule the films are wound at the factory upon spools like 4, and the operator inserts the film cartridge into the pocket $3^a$, from which the film is unwound and carried towards the opposite pocket $3^b$, where its free end is attached to an empty spool 4', upon which the film is wound during the photographic operations, by means of a winding-key 5, in a well-known manner. The spool 4 is rotatably supported in the pocket $3^a$ by similar oppositely facing reciprocatable spindles or trunnions 6—6', which are inserted in the hollow core of the spool, as best seen in Fig. 1. and when so disposed, the spool 4 may be freely rotated on the spindles by the unwinding of the film, as described.

Heretofore, the spindles corresponding to 6—6' have been inserted through the ends of the rails 3—3', and their outer ends are formed with heads, which are disposed in shallow sockets formed in the outer faces of the rails. To withdraw these older spindles, the operator grips the heads with his thumb and finger nails and pulls them outwardly in order to insert the film spools, after which the spindles are pushed inwardly to secure the spools. The construction, application and operation of these older spindles entail considerable labor, expense and inconvenience, and besides, the exposed heads of the spindles greatly interfere with the finishing, as well as disfigures the outer surface of the cameras. The present invention has for its object to provide a cheaper, simpler and more convenient means for accomplishing the same work, which will now be described:

The spindles 6—6' are reciprocatably supported in slotted cores 7, which are bored out axially for the purpose, and said spindles are normally and yieldingly held extended, as shown in Figs. 1 and 3 by coil springs 8. Each of said spindles is provided with a transversely arranged guide pin $6^b$, which is disposed and plays in the slot $7^a$ of the core 7, the object of the slot 7ª being to prevent the rotation of the spindle while it is being reciprocated. The cores 7 are disposed concentrically in cup-shaped bushings 9, which are preferably driven tightly into corresponding axially aligning sockets 9' formed in the inner faces of the rails 3—3'. The cores 7 are provided at one end with reduced portions 7ᵇ, which are driven through corresponding openings in the closed ends of the bushings 9 to which they are made rigid. The cores 7 are cylindrical and considerably smaller in diameter than the bushings, for providing therebetween annular spaces 9ª, in which are rotatably disposed cup-shaped cam members 10, which are employed for reciprocating the spindles 6—6'. The members 10 are provided with oppositely curved cam faces 10'—10ª (see Figs. 7 and 8), which straddle the pins 6ᵇ, and force the said pins and the spindles into the cores 7, when the said cams are rotated, as shown by the full and dotted lines in Fig. 4 by means of integral levers 10ᵇ. The free ends of the arms 10ᵇ are provided with knurled portions 10ᶜ, which are disposed in and traverse curved rabbeted portions 3ᶜ of the rails 3—3', and the adjacent inner faces of the rails are preferably recessed, as at 3ᵈ, to receive and allow suitable play for the levers 10ᵇ. By this construction and arrangement, the several parts are disposed in a manner to economize space, which is very desirable in pocket cameras. After the members 10 are inserted between the cores 7 and the bushings 9, they are rotatably held in place by clips 9ᵇ, which are carried by the open ends of the bushings (see Figs. 4 and 5). To operate the members 10, the operator places his fingers upon the knurled parts 10ᶜ, and forces the levers 10 outwardly and downwardly, as from the full line to the dotted line position shown in Fig. 4. This operation effects the endwise movement of the spindles 6—6' in opposite directions into their respective sockets 7', and allows the film spools to be either disposed in or removed from the pocket 3ª. After the spools are inserted in the said pockets, the operator should swing the levers 10ᵇ back to the full line position shown in Fig. 4. This shifts the cam-faces 10'—10ª in a manner to allow the springs 8 to move the spindles towards their fully extended positions, as shown in Figs. 1 and 4. As long as the levers 10ᵇ are in the full line position of Figs. 1 and 4, the spindles are held extended alone by the tension of the springs 8, and at such times (in case the pocket 3ª is empty) the spindles may be forced back into the cores 7 by the operator at will, without disturbing the levers 10ᵇ.

The film spool 4', which is shown in the pocket 3ᵇ, is supported at one end by the shank of the winding-key 5, by which the used film is wound on the said spool, while the opposite end of spool 4' is preferably supported by one of my attachments, as shown in Figs. 1 and 2.

In the preferred construction, arrangement and operation of the devices, the operating levers 10ᵇ, which control the spool 4, are movable simultaneously in the directions indicated by the full and dotted lines in Fig. 4, for effecting the reciprocation of the spindles 6—6'. In order to accomplish this, the cam portions 10'—10ª which operate the spindle 6', are reversed as compared with the showing in Figs. 7 and 8, in a well-known manner.

Having thus described my invention, what I claim, is—

1. The combination with the side rails of a camera having aligning facing sockets and a film spool operable in a pocket lying between said sockets, of a reciprocatable spindle carried by each rail, springs carried by said rails adapted to move said spindles towards each other for supporting said film spool, and cam members carried by said rails adapted when rotated in one direction to move said spindles away from each other for releasing said film spool.

2. The combination with the spaced rails of a camera, the inner faces of said rails having aligning sockets, and a film spool, of reciprocatable spindles for supporting said film disposed in said sockets, cam members rotatable in said sockets having oppositely curved cam-faces adapted to move said spindles away from each other for releasing said film spool, and springs disposed in said sockets adapted to normally hold said spindles extended beyond said sockets for supporting said film spool in axial alignment with said sockets.

3. The combination with the spaced side rails of a camera having aligning facing sockets, and a film spool operable in a pocket lying between said sockets, of a spindle for supporting said film spool reciprocatably disposed in each of said sockets, resilient means for extending and holding said spindles in engagement with said film spool, and cam members carried by said sockets adapted when rotated in one direction to withdraw said spindles from said film spool.

4. The combination with the spaced side rails of a camera having aligning facing sockets, and a film spool adapted to be detachably mounted between said rails in line with said sockets, of trunnions for supporting the opposite ends of the film spool reciprocatably disposed in said sockets, cams for moving said trunnions into said sockets for releasing the film spool, and tension means for moving said trunnions in the opposite direction for engaging the film spool.

5. The combination with the frame of a camera comprising the spaced side rails having aligning sockets in their inner faces, and a detachable film spool, of reciprocatable spindles disposed in said sockets and having guide-pins, springs for normally holding said spindles extended beyond the rails for supporting the said spool, a cylindrical cam member rotatable in each socket and having cam-faces for engaging said guide-pins adapted when rotated in one direction to withdraw said spindles from said spool.

6. A camera comprising similar spaced side rails provided with aligning facing sockets, and a film spool adapted to be operatively disposed between the ends of said rails, reciprocatable spindles operatively supported in said sockets adapted when extended to support said spool, cam members disposed concentrically in said sockets adapted when rotated in one direction to free said spindles from said spool, and tension means for ejecting said spindles from said sockets when the cam members are rotated in the opposite direction.

7. The combination with the side rails of a camera frame having corresponding sockets formed in their inner faces, and a hollow film reel, of a spindle reciprocatably supported by each rail and having a guide-pin, said spindles when extended adapted to telescope the ends of said reel, cores having sockets to receive said spindles and having slots in which said guide-pins play, springs disposed in the sockets of said cores and exerting their tension for holding the spindles extended, bushings tightly held in the rail sockets and supporting the corresponding cores, and cylindrical cam members disposed between the cores and bushings, said cam members having oppositely facing cam portions adapted to engage said guide-pins and to force said spindles into said cores for releasing the film reel.

In testimony whereof I affix my signature.

LOUIS LISSON.